(No Model.)
E. KERSTEN.
PROCESS OF CLARIFYING BEER.
No. 300,981. Patented June 24, 1884.
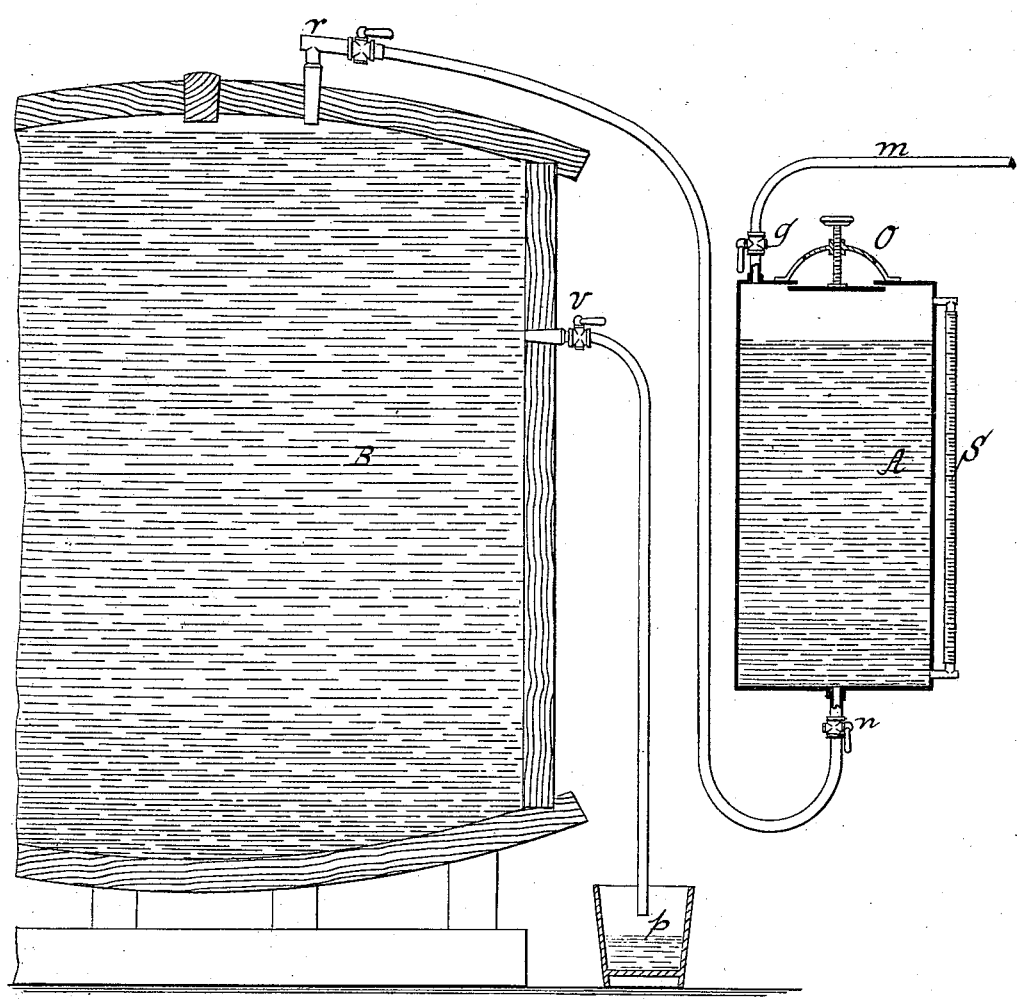
WITNESSES:
William Miller
Otto Hufeland
INVENTOR
Emil Kersten
BY Van Santvoord & Hauff
his ATTORNEYS

UNITED STATES PATENT OFFICE.

EMIL KERSTEN, OF CHARLESTON, SOUTH CAROLINA.

PROCESS OF CLARIFYING BEER.

SPECIFICATION forming part of Letters Patent No. 300,981, dated June 24, 1884.

Application filed December 5, 1883. (No model.)

*To all whom it may concern:*

Be it known that I, EMIL KERSTEN, a citizen of Prussia, Germany, residing at Charleston, in the county of Charleston, in the State of South Carolina, have invented new and useful Improvements in Processes of Clarifying Beer, of which the following is a specification.

This invention has for its object to provide an improved process of clarifying beer; and to such end it consists in transferring the beer directly from the fermenting-casks into the shavings-casks, closing the shavings-casks, so as to retain within the same the carbonic-acid gas produced by the second fermentation, and forcibly injecting into the beer, thus under pressure, a clarifying material, while at the same time a certain amount of the beer is drawn off, while the beer is under pressure and at the same time that a certain quantity of beer is permitted to flow from the cask.

The accompanying drawing represents an apparatus such as may be used in carrying out my invention.

In this drawing, the letter A designates a cylindrical vessel, made of wood or metal, which can sustain a pressure of from twelve to fifteen pounds to the square inch. It is provided with an opening, O, which can be closed hermetically. Through this opening the vessel can be charged and cleaned. Said vessel is provided with two cocks, $g$ $n$, and a water-gage, S. After the vessel A has been charged with the finings prepared according to well-known prescriptions, the opening O is hermetically closed, the cock $g$ is connected by a hose, $m$, with an air-pump, and the cock $n$ is connected with the vent-cock $r$ of the cask B, which contains the beer to be clarified. In the head of this cask is a cock, $v$, from which extends a pipe into a suitable bucket or vessel, $p$. The cask B is hermetically closed, and the beer contained therein evolves carbonic-acid gas, so that it (the beer) is under a pressure of, say, six to eight pounds to the square inch. If the air-pump is set in motion until the pressure in the vessel A A exceeds that in the cask B, and the cocks $g$, $n$, $r$, and $v$ are opened, the finings are forced into the cask and distributed therein while a corresponding quantity of beer flows off through the cock $v$. The water-gage S indicates the quantity of finings which has been forced into the cask, and if the desired quantity has been reached the cocks $g$, $n$, $r$, and $v$ are closed. The clarifying process of the beer in the cask B is then finished, and the vessel A can be connected to a second cask. It is necessary to allow a quantity of beer to flow from the cask while the finings are being introduced, as otherwise the requisite quantity of finings could not be introduced without bursting the cask; and, furthermore, by the current of beer flowing from the cask the finings are caused to rapidly mix with the beer.

From this description it will be seen that according to my invention the clarification of the beer is effected while the same is under pressure. As usually practiced in breweries, the beer is brought from the fermenting-casks into reposing-casks, whence it is brought into shavings-casks, in which it is mixed with kraeusen-beer, and after from one to eight days the finings are introduced, and then the casks are closed. As soon as the beer has become clear and saturated with sufficient carbonic acid, it is drawn off into barrels ready for use. I bring the beer directly from the fermenting-casks into the shavings-casks and close the same, so that the carbonic acid produced by the second fermentation remains in the casks, and then I introduce the finings without allowing the carbonic acid to escape, so that the kraeusen operation is not required and the beer can be drawn into barrels after from two to twelve hours. By these means a saving in labor, in beer, and finings is effected.

What I claim as new, and desire to secure by Letters Patent, is—

The process herein described of clarifying beer, which consists in transferring the beer directly from the fermenting-casks into the shavings-casks, closing the shavings-casks to retain within the same the carbonic-acid gas produced by the second fermentation, and forcibly injecting into the beer thus under pressure a clarifying material, while at the same time a certain amount of the beer is drawn off, substantially as set forth.

In testimony whereof I have hereunto set my hand and seal in the presence of two witnesses.

EMIL KERSTEN. [L. S.]

Witnesses:
 C. L. STICKNEY,
 JOHN D. PLETSCHER.